COMPUTER MEMORY UNIT AND ADDRESSING MEANS

Filed Jan. 21, 1958 9 Sheets-Sheet 1

INVENTOR
EUGENI ESTREMS
BY James A. Ruth
AGENT

May 5, 1964 E. ESTREMS 3,132,324

COMPUTER MEMORY UNIT AND ADDRESSING MEANS

Filed Jan. 21, 1958 9 Sheets-Sheet 2

COMPUTER MEMORY UNIT AND ADDRESSING MEANS

Filed Jan. 21, 1958 9 Sheets-Sheet 7

United States Patent Office 3,132,324

Patented May 5, 1964

3,132,324

COMPUTER MEMORY UNIT AND ADDRESSING MEANS

Eugeni Estrems, Saint Mande, France, assignor to International Business Machines Corporation, New York, N.Y., a corporation of New York Filed Jan. 21, 1958, Ser. No. 710,312

Claims priority, application France Jan. 23, 1957

12 Claims. (Cl. 340—172.5)

The present invention relates to improvements in computing machines and more particularly to means for controlling unit memories, counters, or the like.

It is known that computing machines and the like involve a more or less large number of counters and/or memory units which are used for storing or operating upon data and for the storing of results of said operations. It is essential that means be provided for facilitating data access to and/or egress from each of these counters or memories.

Hence, a factor to be considered in the design of computers is the number capacity of individual registers, counters or memory units. Past experience has demonstrated that capacities for memory units may be in the range of 8, 10 or 12 decimal digit orders. However, in data processing applications recently evolved provision is needed for memories or registers which handle a large data turnover and where each datum may comprise but a few decimal digit orders.

In order to provide for such contingencies, prior designs have provided for lodging more than one factor in a given memory unit or register, and for this purpose auxiliary arrangements have been provided for splitting the memories so that each factor, so stored, may be read out on command of the program unit.

Similarly, on the other hand, it is possible to distribute a large number among two or more low capacity memories.

All of these operational devices restrict the flexibility of the computer and exact penalties, for example, double or triple programs must be used thereby reducing the real time output of the computer.

The question as to how many, what capacity, and what type of memory units will be used is generally settled as a compromise, taking the form of a large number of medium capacity memory units.

The invention contemplates means for transferring information that may be contained in a single memory unit, in plural memories and/or fractional parts of a memory unit hereinafter denoted as fields, by providing versatile selection units cooperating via changeable plug wires with given upper and lower limits of preselected fields according to, and under control of, a program means. The means disclosed here makes possible the arbitrary successive subdivision of a memory unit into as many pluralities of fields as are required for a given data processing problem without unduly sacrificing real time production of the computer.

The main object of this invention resides in the provision of novel means for reading data into or out of plural subdivided memory units without regard for the relation between the number of orders representing the said data and the fractions of the memory units involved.

Another object of the invention resides in the provision of novel means for splitting a memory unit arbitrarily into any desired number of fields, each field being determined by a system of plug hub connections for defining the positions of the lowest and highest decimal digital orders.

Another object of the invention resides in the provision of electronic commutator means coacting with the said arbitrarily defined memory fields wherein each commutator element operates to determine field selection for readout or readin of data.

Yet a further object of the invention resides in the provision of a pair of commutator chains for determining the upper and lower limits of a field selected whole and/or fractional memory for readout or readin of data.

With reference to the above object, further features of the invention reside in the provision of novel means for:

(1) Splitting any memory of size $m$ into $n$ arbitrarily selected fields.

(2) Splitting any selected field $n$ into $n'$ further subfields.

(3) Reflecting in other memories $m'$ or $m''$ the same splits selected under 1 and/or 2.

According to this invention it is possible to extend, or limit, at will, any operational field in a memory unit of any given number of positions, according to the requirements of the problem to be solved.

Yet another object of the invention resides in the provision of means for interlocking the field selection commutator circuits for the transfer of data from one preselected field of a memory to another preselected field, and where means are provided for interrupting said transfer upon sensing of the last digital order of the selected field.

Another object of the invention consists of a new process and provision of a new device for enabling addition of a number A contained in any field of any memory, to a number B, also contained in any field of any other memory, this operation being performed digit by digit through the alternate scanning of each position in the emitting memory and the receiving memory; the result of the addition of two digits of the same order, account being taken of carries which can intervene in the addition of lower orders, whereby the operation is performed without the aid of ordinary accumulating devices.

Other objects of the invention will be pointed out in the following description and claims and illustrated in the accompanying drawings, which disclose, by way of examples, the principle of the invention and the best mode, which has been contemplated, of applying that principle.

Figure 12:
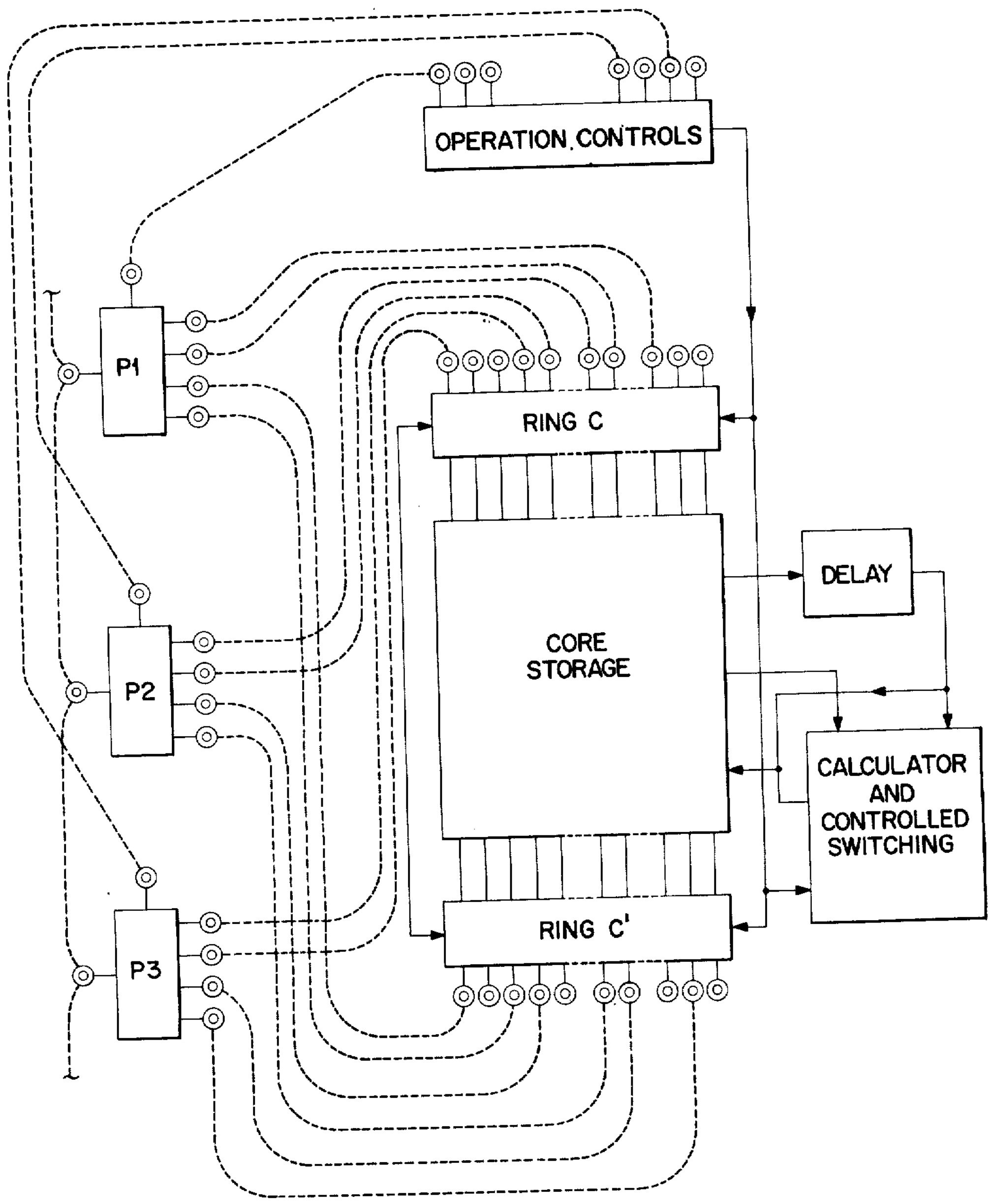
FIG. 12 is a block diagram of a data processing machine constructed in accordance with the present invention.

Referring to FIG. 12, there is shown a block diagram of a data processing machine constructed in accordance with the present invention. The machine is shown as having a plurality of program steps indicated as P1, P2 and P3 connected together by plug wires to form a ring type program device. Although only three stages of the program device are shown, any number might be employed in the manner indicated. An array of static data storage elements is shown as a core storage array having a pair of rings C and C′ as addressing means to individually address the several cores comprising the array. The rings C and C′ are constructed such that when started in operation at a particular location, will simultaneously address successive locations in the array until stopped or until the end of the ring is reached. Ring C may be driven to address a first storage element of the array after which ring C′ addresses a storage element of the array, etc. Thus rings C and C′ alternately address storage elements in the array. In this manner individual characters of two words or fields are alternately addressed and thus may be alternately read out of the array. A delay device is arranged to receive the data from the storage elements addressed by ring C and delay this data so that the output data from the delay occurs simultaneously with the data from the storage elements addressed by ring C′. The data from the storage elements addressed by rings C and C′ may thus be simultaneously transmitted to a calculator for performing any desired arithmetic operation such as adding. Alternately, the data from the storage elements addressed by ring C may be fed through the delay device and entered back into the array into the storage elements addressed by ring C′. Thus, a group of characters of data may be transferred from one position in the storage array to another position.

The program step is effective to control the starting positions of the rings C and C′ and also effective to control the stopping positions of these rings. Plug wires are connected from a program step to the positions of ring C at which it is desired to start ring C and at which it is desired to stop the ring for the particular program involved. This is also true of the connections from the program step to the ring C′. The position of a ring to which a plug wire is connected from the program step determines the address of the data in the core storage array at which it is desired to start reading out. Another plug wire controls the ring to stop and thus determines the address of the end of the sequence of data desired to be addressed in the storage array. Since the rings address all data between the address just mentioned in sequence, a field of data defined by the plug wires may be sequentially operated upon. A common sense line threads all the cores of the array for sensing addressed cores.

The program steps activate the operation controls to enable any desired arithmetic operation to be performed or to enable transfer operations to be performed. Rings C a nd C′ are interconnected such that one may exercise control over the other upon reaching a plug wire indicating the end of a field. The details of the data processing machine indicated in block form in FIG. 12 are shown in FIGS. 1*a* through 1*e*.

COMPONENT CIRCUITS

Figure 4:
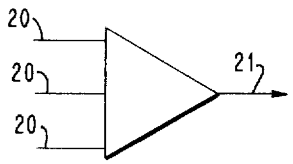
FIGS. 4 through 11 show the basic circuits and the schematic representation in which these circuits are used in FIGS. 1*a* through 1*e*.
Figure 4A:
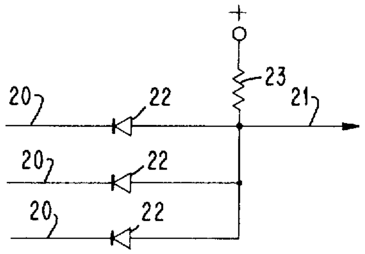

FIG. 4*a* shows a coincidence circuit. Input lines 20 receive a voltage normally negative, which in certain conditions may become positive. In the first case, output line 21 receives a negative voltage owing to the fact that diodes 22 allow the current to traverse, providing a relatively large voltage drop across resistor 23. On the other hand, if all of lines 20 simultaneously receive a positive voltage, no current can set up across diodes 22 so that the diode leakage current flows through resistor 23. The corresponding voltage drop being relatively low, the potential on line 21 rises abruptly to a value near that of the supply. This positive pulse on line 21 represents the existence of a coincidence between the positive input pulses.

The circuit in FIG. 4*a* is also shown schematically in FIG. 4.

Figure 5:
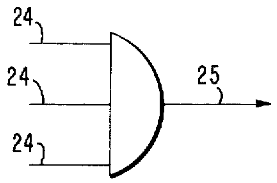
Figure 5A:
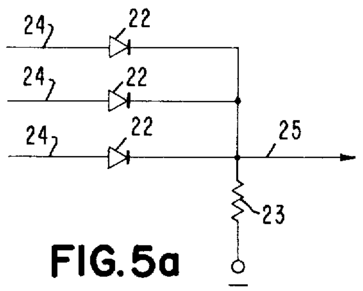

FIG. 5 shows the schematic form of the OR circuit of FIG. 5*a*. Output line 25 has impressed thereupon a normally negative voltage which immediately becomes positive as soon as one of input lines 24 is made positive.

Figure 6:
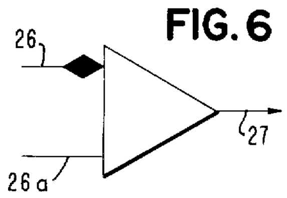
Figure 6A:
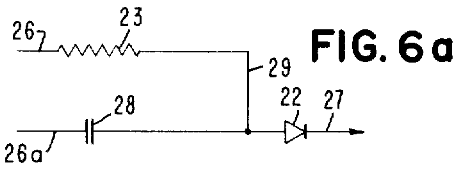

FIG. 6 is a schematic of the circuit of FIG. 6*a*. The latter is a coincidence or AND circuit used for transmitting very short duration positive going pulses required for controlling triggers or the like. Inputs 26 and **26*a* are normally negative and positive, respectively. As long as input 26 is negative, pulses imparted to input 26*a* remain ineffective due to line 29 which is then at a negative potential, and to diode 22 which blocks the transmission of the pulses. On the other hand, when input 26 has a positive voltage, the potential of line 29 takes up a positive value, thereby permitting transmission of all the positive pulses applied to input 26*a*. Each time the potential of input 26*a* makes a positive excusion, capacitor 28 will then pass a short duration positive pulse that causes the potential of line 29 to increase momentarily. The polarity is such that diode 22 will transmit the pulse to line 27**.

Figure 7:
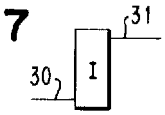
Figure 7A:
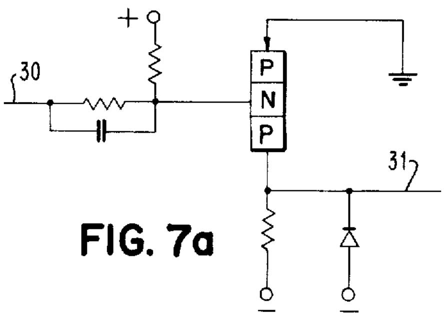

FIG. 7 is a schematic of the circuit of FIG. 7*a*. The latter is a phase inverter. Output 31 is positive every time input 30 is negative and conversely.

Figure 8:
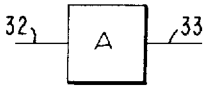
Figure 8A:
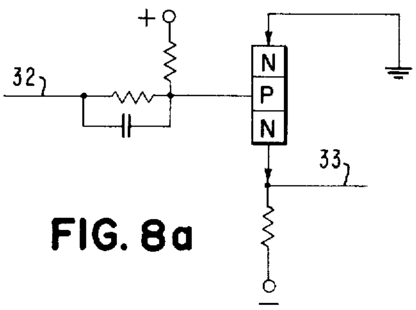

FIG. 8*a* is a power amplifier circuit schematically shown in FIG. 8. Input signals applied to line 32 are reproduced on output line 33 in the same phase. In view of the fact that the amplifier of FIG. 8 is not, per se, an essential part of the invention claimed, it will not generally be separately referenced in the other drawings.

Figure 9:
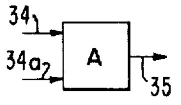
Figure 9B:
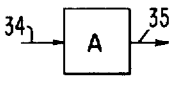
Figure 9A:
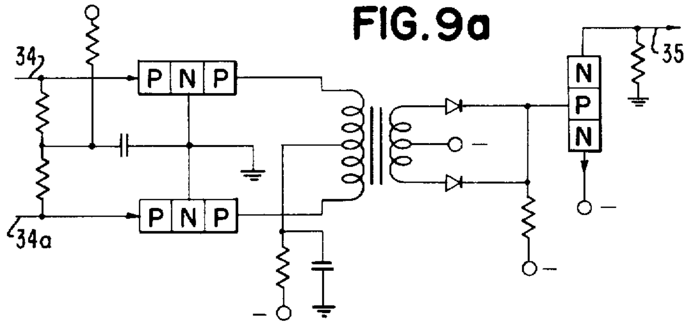

FIG. 9*a* shows an amplifying circuit used in connection with magnetic core memories. The E.M.F. induced during the magnetism reversal is applied across inputs 34 and **34*a*. A positive pulse is then produced upon output 35**. The circuit also is represented in FIGS. 1*a* through 1*e* in the diagrammatical form shown in FIGS. 9*b* or 9*c*. FIG. 9*b* shows a single ended input, while FIG. 9*c* corresponds exactly to FIG 9*a*.

Figures 10, 10A:
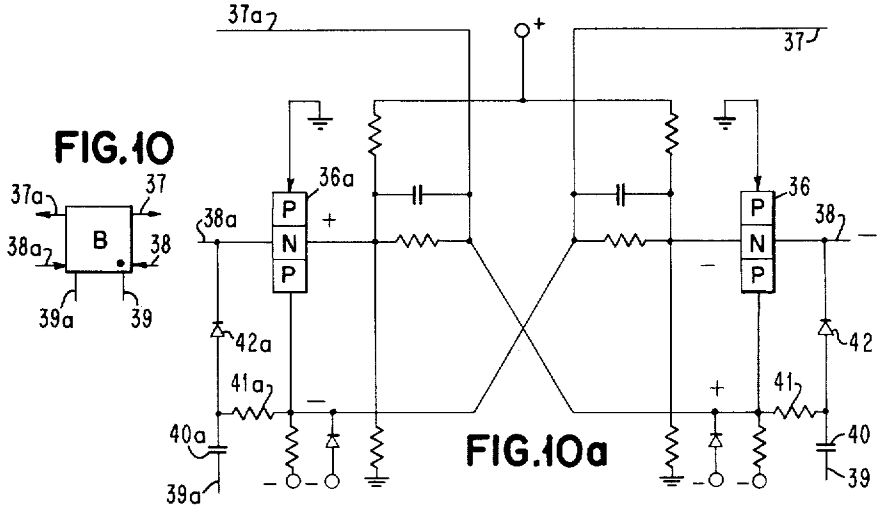

FIG. 10*a* represents a transistorized trigger. Such a circuit has been described completely in the patent application filed by the applicant on March 1, 1957, under Serial Number 643,369, now U.S. Patent 2,947,865, entitled "Impulse Distributor." A brief summary of its operation is given below.

A first stable state of the circuit corresponds to a conduction through transistor 36. The normal state is indicated by a dot in the lower right hand corner of the trigger symbol in FIG. 10, and below transistor 36 in FIG. 10*a*. In this state output line 37 is at a relatively negative voltage, and line **37*a* is at a relatively positive voltage. The state of the trigger may be switched by a positive going pulse applied to input line 38. A positive pulse applied to input 38*a*** has no effect at this time. In any case, trigger operating pulses applied to these lines can be produced by a circuit of the type shown in FIGS. 6 and 6*a*. The state of the trigger may also be switched by a positive going pulse applied to line 39. Such a pulse is differentiated by capacitor 40, resistor 41 and diode 42, which circuit is nothing other than an AND circuit of the type shown in FIG. 6*a*. It should be noted particularly that one of the ends of resistor 41 is integral with output **37*a*, which is at this time at a relatively positive voltage. A positive voltage applied to line 39*a* is of no consequence due to the fact that the end of resistor 42*a* is integral with line 37** which is at this time at a relatively negative voltage.

A second stable state of the trigger corresponds to conduction through transistor **36*a*. In this case, output 37*a* assumes a relatively negative voltage whereas output 37 then assumes a relatively positive voltage. The state of the trigger may be switched either by a positive pulse applied to line 38*a*, or by a positive voltage applied to line 39*a*. It goes without saying that this switching is accompanied by a reversal of respective potentials in lines 37 and 37*a***.

The trigger in FIG. 10*a* is represented in FIGS. 1*a* through 1*e* by using the schematic shown in FIG. 10*a*, reference letters being B, C or P. A spot placed inside of the square, on the right or the left, indicates the normally conducting side.

Figures 11, 11A:
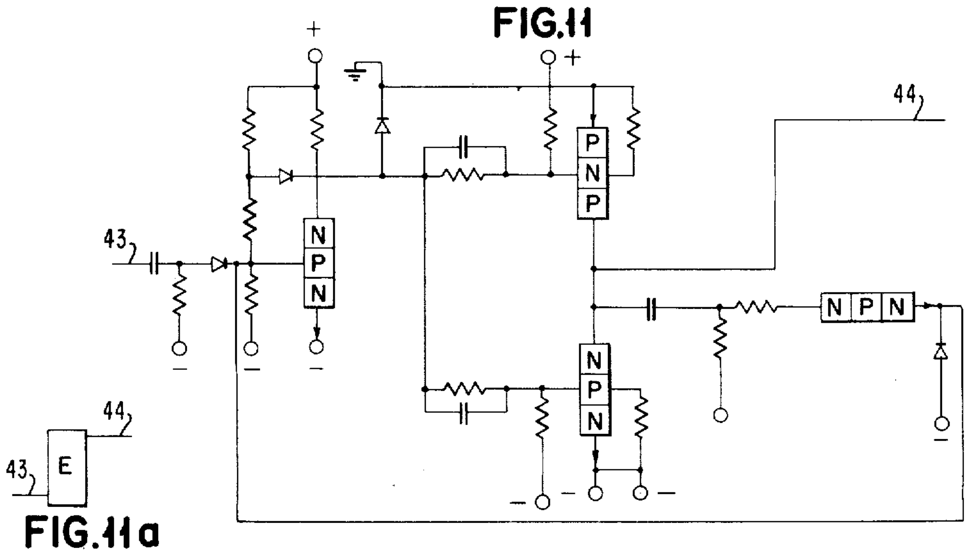

FIG. 11 shows a pulse emitter. A positive voltage applied to line 43, produces at output 44, an in phase positive pulse of relatively short duration. The circuit of FIG. 11 is schematically shown in FIG. 11*a*.

*Pulse Generating Commutator*

The pulse generator comprises four emitters 100–*a*, 101–*a*, 102–*a*, 103–*a* (FIG 1*b*), operating in a closed ring.

This pulse generator may be operated or disabled at will under the following conditions. Capacitor 104 is positively charged through circuit breaker 105 and resistor 106 connected to a source of positive potential. When the contacts of circuit breaker 105 are shifted a positive voltage is placed upon line 107 and upon one input of coincidence circuit 108. Lines 109, 110, 111 (FIG. 1*a*) are also at a relatively positive voltage. The last two, respectively, are connected to triggers B4 (FIG. 1*b*) B8 (FIG. 1*a*) on the side opposite to that where these triggers normally conduct. As a result output line 109 (FIG. 1*b*) of coincidence circuit 112 is rendered positive as is output line 113—113*a* of coincidence circuit 108. This positive signal voltage is fed to OR circuit 114, thence to amplifier 115 and pulse emitter 103*a*. The latter, then produces its first pulse. Said pulse is fed over line 103 to emitter 100–*a* and the other elements in the ring for producing the timed sequence of pulses shown at 103, 100, 101 and 102 in FIG. 2.

Figure 1A:
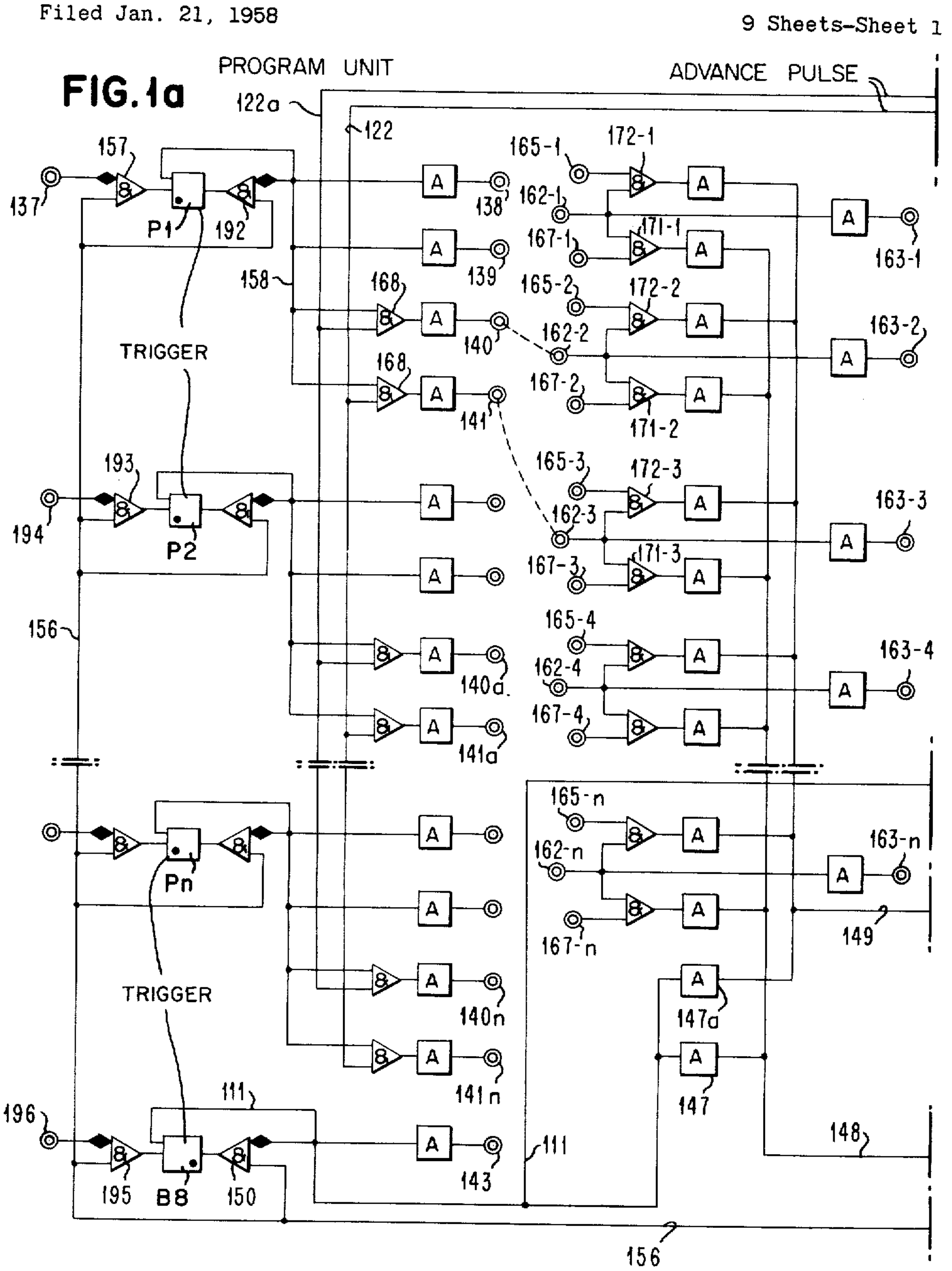
FIGS. 1*a* through 1*e* represent the circuitry.
Figure 1:
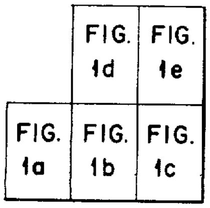
FIG. 1 shows the general arrangement of FIGS. 1*a* through 1*e*.

The first pulse transmitted over line 103 causes the switching of triggers B4 (FIG. 1*b*) and B8 (FIG. 1*a*). The switching of trigger B8 imposes a relatively negative voltage upon line 111, one of the inputs to AND circuit 112 (FIG. 1*b*) which is thus blocked, so that its output line 109 is rendered relatively negative for also blocking AND circuit 108. Under these conditions, output line 117 of inverter 116 is rendered relatively positive thereby conditioning AND circuit 118 for transmission therethrough of the pulse produced by emitter 102*a*, when it occurs, to emitter 103*a* through OR circuit 114 for establishing a circuit from the output of emitter 102*a* to the input of emitter 103*a*. This operation causes the ring of emitters to continuously produce time separated pulses so long as the voltage on line 111 is maintained negative.

Figure 1B:
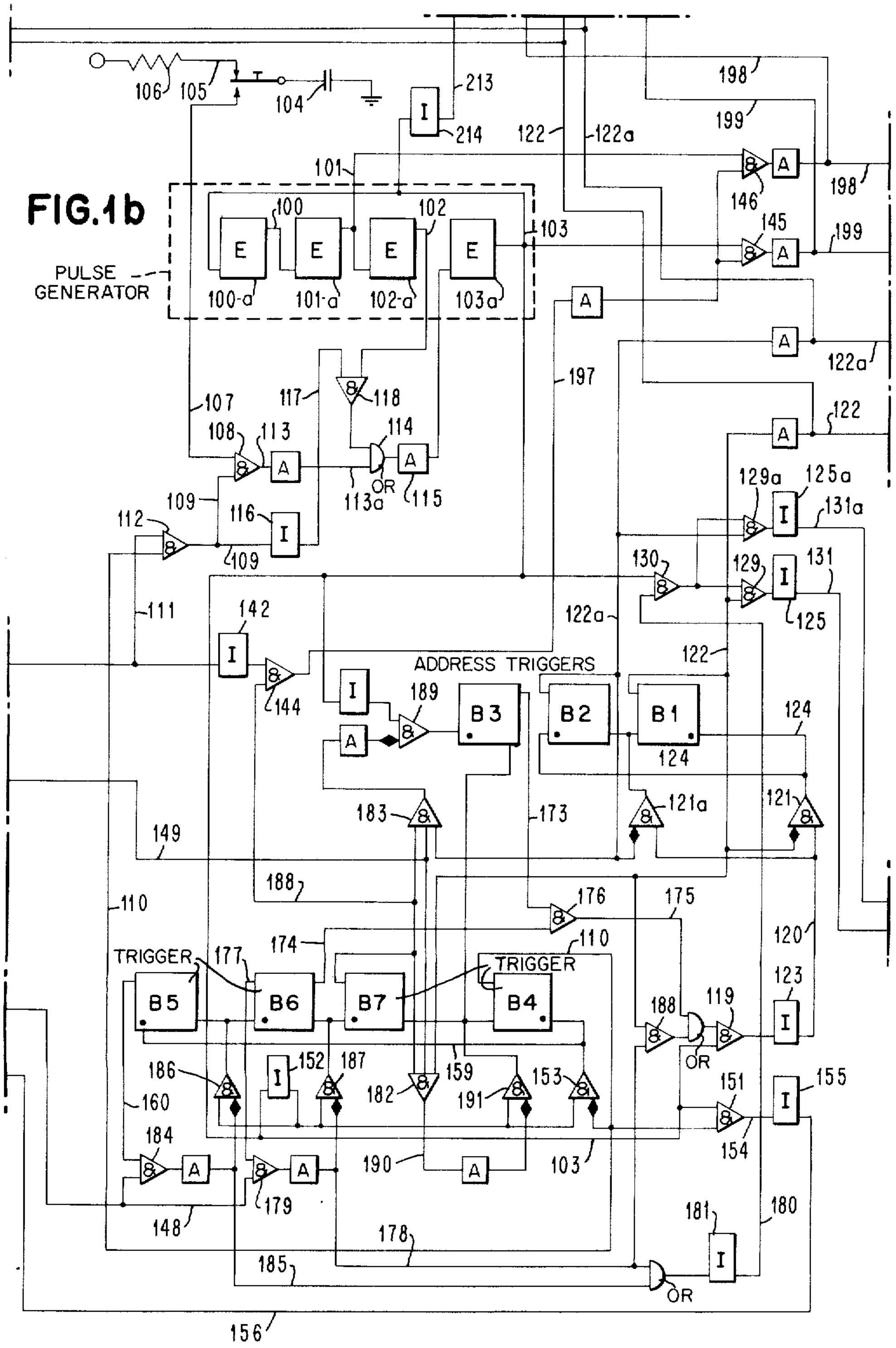
Figure 1C:
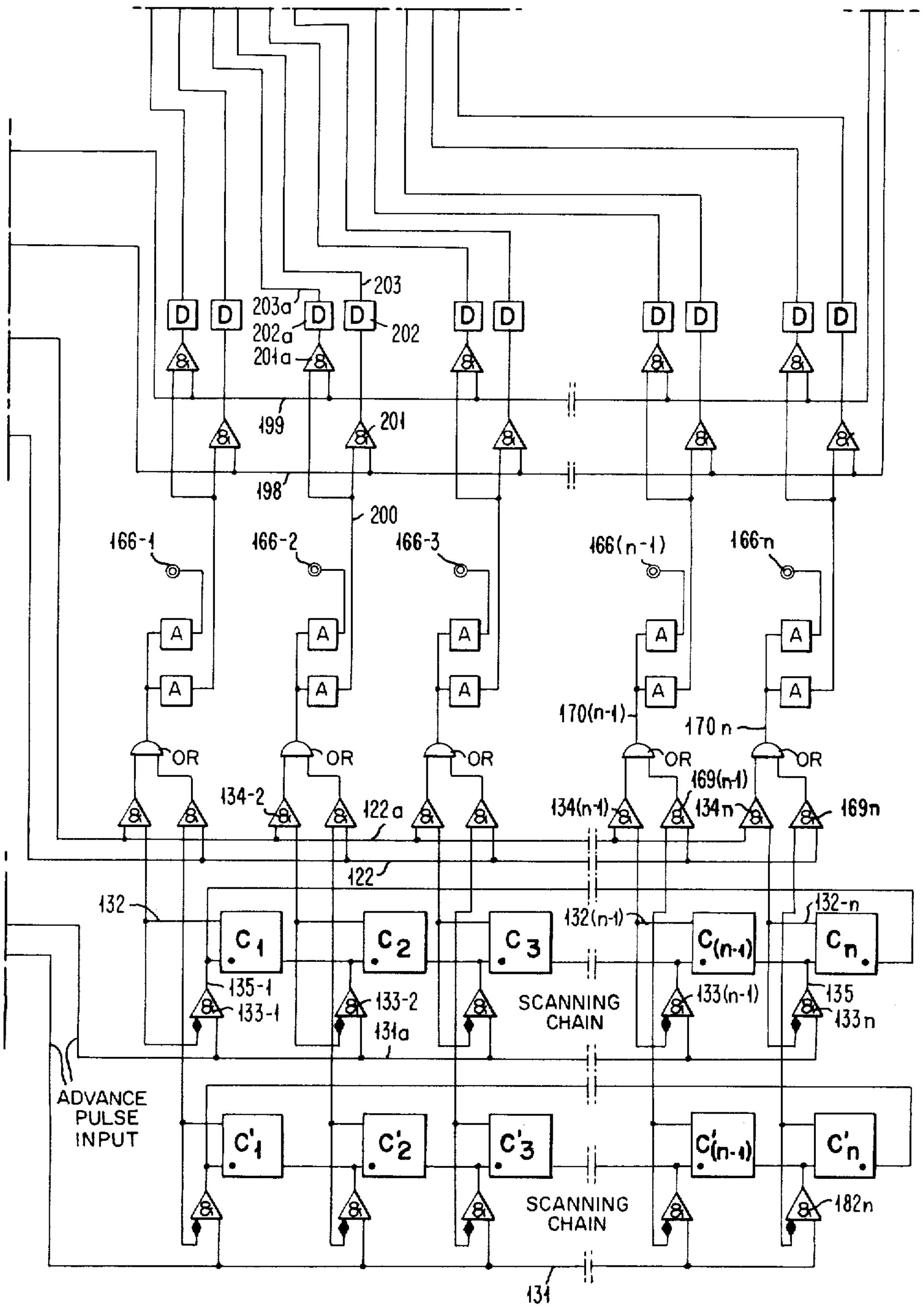
Figure 1D:
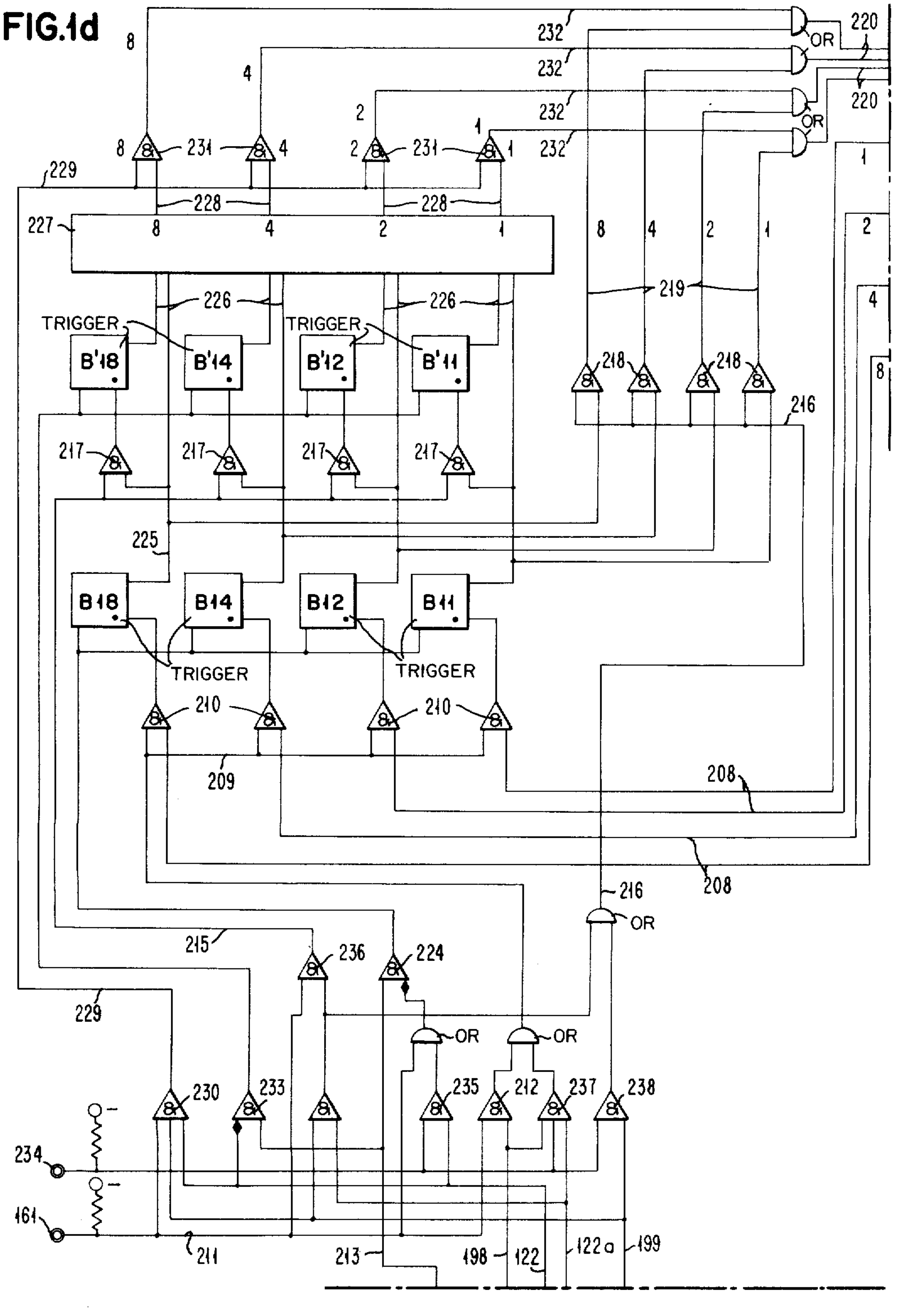
Figure 1E:
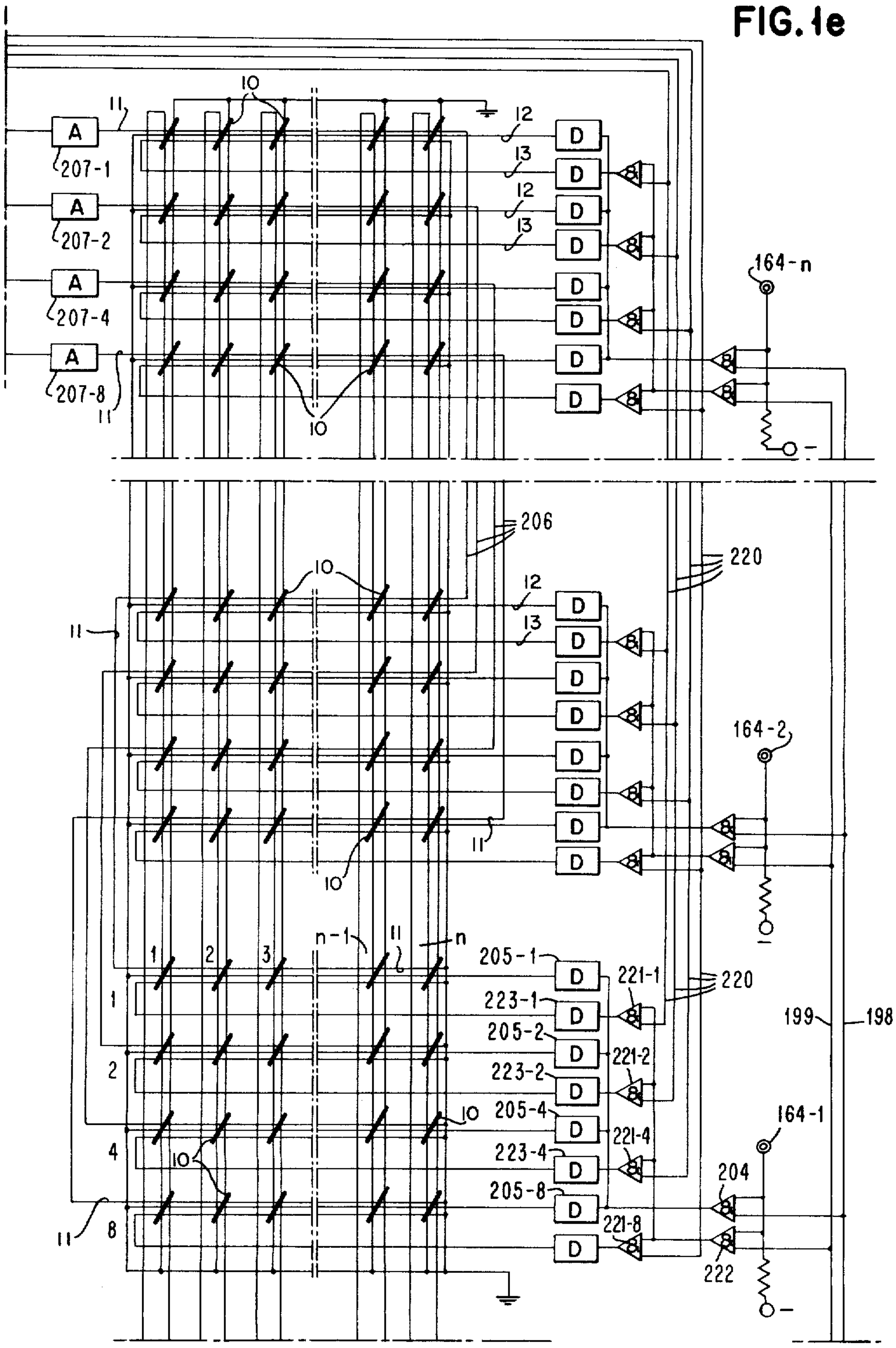

The memory device contemplated for use with this invention comprises a plurality of annular bistable magnetic core elements 10, as illustrated in FIG. 1*e*. Each core 10 is provided with three windings. Winding 11 consists of one turn passing through all the cores which represent similar binary-decimal code positions. Winding 12 consists of a plurality of turns around each core which pass in sequence through all the cores representing any given decimal digit order. Winding 13 consists of a winding similar to winding 11. Magnetization of a core 10 to one remanence state is arbitrarily chosen as a binary "zero" condition, and to the other remanence state as a binary "one" condition. Having once been magnetized in a particular remanence state, the core will retain that state until application of a suitable magnetomotive force in a reverse sense, at which time the core will flip to its other binary condition.

The number notation scheme adopted here is a modified binary decimal code wherein each decimal digit is represented by combinations of binary bits 1—2—4—8. Thus, each decimal digit requires four magnetic cores for its complete representation.

The magnetic core matrix memory shown in FIG. 1*e* illustrates three memory sections, each capable of storing 80 decimal digits according to the 1—2—4—8 combinational code.

According to the invention it must be possible to secure access at will to any arbitrarily defined field subdivision of these memories for either input of data or the extraction of data. Field access may be obtained by the combination of circuits now to be described.

The control circuits for the core memory comprise (1) address switching means, (2) means for generating pulses for advancing a scanning chain of triggers, (3) the scanning chain, (4) a programming unit, and (5) a memory splitting device. These circuits are each described below.

*The Address Switch*

This invention is applied to a data processing machine operating in accordance with the so-called double address system. In such a machine the basic addition operation of $a+b=c$, is effected by withdrawing factor $a$ from the memory, then factor $b$, computing their sum $c$ in an adder and then substituting sum $c$ back in the memory in the same place that factor $b$ was withdrawn. While this invention is directed to a double address type of machine it will be appreciated that the logic may be expanded to use triple or other multiple address circuits in data processing machines. It will suffice for this purpose to add trigger units to the address trigger chain B1 and B2. Triggers B1 and B2 are operated by pulses generated by the emitter chain previously described.

Referring to FIG. 1*b* it will be seen that wire 103 is directly connected to AND circuit 119, and thence from the output of 119 through an inverter 123 over line 120 to a pair of AND circuits 121 and 121*a*. AND circuits 121 control the address triggers B1 and B2. Assume that AND circuit 119 has been conditioned for operation and that triggers B1 and B2 are set, as is indicated in FIG. 1*b*.

Figure 2:
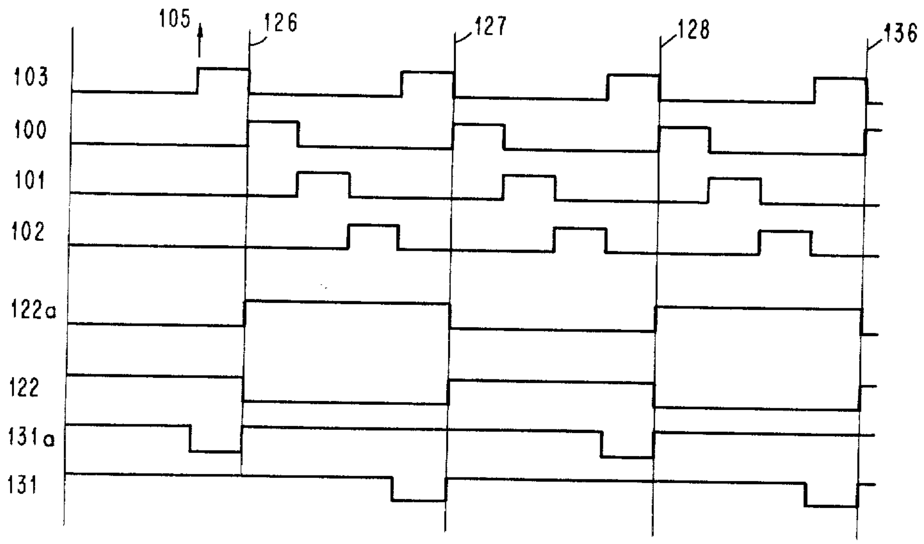

Refer now to the timing chart, as shown in FIG. 2, in conjunction with the circuit shown in FIG. 1*b*. With triggers B1 and B2 in the states indicated on the drawing, lines 122 and 122*a*, respectively, will be relatively positive and negative, hence AND circuits 121 and 121*a*, respectively, will be conditioned and not conditioned. At such time as emitter 103*a* generates a pulse on wire 103, the said pulse is passed through AND circuit 119 and inverter 123 along line 120 to the inputs of AND circuits 121 and 121*a*. As AND circuit 121 is conditioned the pulse is passed therethrough along wire 124 to flip triggers B1 and B2. As these triggers have now switched their states the potentials on lines 122 and 122*a* are reversed.

It will be apparent that these circuits have been so arranged that the triggers are operated by the trailing edge of the switching pulses, and it will be appreciated that the rising edges of the pulses produced by trigger B2 on line 122*a* coincide with the trailing edge of the pulse produced by emitter 103*a*. These times are shown by vertical line 126 on the timing chart in FIG. 2. Now that the triggers have reversed their states, AND circuit 121*a* is conditioned and AND circuit 121 is not conditioned. Hence, at the time of arrival of the trailing edge of the next pulse produced on line 103 the triggers will be again switched so that line 122 reassumes a relatively positive voltage. The time of this action is shown by line 127 in FIG. 2. Thus, each pulse received and transmitted over line 120 causes triggers B1 and B2 to switch from one stable state to the other, thereby producing on lines 122 and 122*a* alternatingly positive voltages.

*Scanning Chain Advance Pulses*

The means for producing the advance pulses for operating the scanning chain are operated by the alternating positive going pulses produced on lines 122 and 122*a*. These positive going pulses are impressed upon AND circuits 129 and 129*a*, which are conditioned for operation by pulses produced by emitter 103*a* filtered through an AND circuit 130. The alternating pulses produced by AND circuits 129 and 129*a* are passed through a pair of inverters 125 and 125*a* for transmission along lines 131 and 131*a* to the scanning chains.

*The Scanning Chains*

In a multiple address type data processing machine it is considered necessary to use as many separate scanning chains as there are addresses. A particularly suitable type of scanning chain has been described in a co-pending application by the applicant, Serial No. 643,369, filed on March 1, 1957, entitled Impulse Distributor, now U.S. Patent 2,947,865.

While a pulse distribution chain of the type described in the above-mentioned application is particularly suitable for use in a commercial embodiment of a data processing machine, a conventional chain of triggers connected in the binary mode has been adopted here simply for the purpose of simplifying the understanding and description of this invention. Each of said chains comprise a series of 80 binary connected triggers. The first chain is formed by triggers $C_1$ through $C_n$, where $n=80$, and where each trigger also corresponds to a position in the core memory which bears the same index number, for example, trigger $C_2$ corresponds to the cores in the second decimal order from the left, as shown in FIG. 1*e*.

The normal stable state of each trigger is indicated in FIG. 1*c* by a dot in a lower corner of the trigger box. It will be noted that triggers $C_1$ through $C_{(n-1)}$ produce a relatively negative voltage at their left outputs 132, 132*n*—1. Because trigger $C_n$ is reset to the opposite state its left output 132*n* receives a relatively positive voltage. As a result AND circuits 133*n* and 134*n* associated therewith are conditioned for conduction. AND circuits 134 are used for controlling the 80 orders of the core memory core triggers for one of the two addresses. The positions of the other address are controlled by a similar chain of binary connected triggers $C'_1$, $C'_n$. The chain of primed triggers is also provided with control AND circuits similar to AND circuits 133.

The alternatingly positive pulses produced on lines 131 and 131*a* operate to alternatingly advance these two chains of binary connected triggers in retrograde fashion beginning respectively with triggers $C_n$ and $C'_n$. The first of the alternating pulses occurring on line 131*a* serves to switch triggers $C_n$ and $C_{(n-1)}$ from their normal stable state to the active stable state, AND circuits 133*n* and 133*n*—1 having been previously conditioned for operation by the switched triggers themselves. Similarly, triggers $C'_n$ and $C'_{(n-1)}$ are switched by the first of the alternating occurring pulses on line 131.

It will be appreciated that as the alternatingly occurring pulses are transmitted along lines 131*a* and 131, the separate triggers of the two address chains are alternatingly switched from one stable state to another in retrograde fashion. By this means the positions of each chain are alternatingly scanned successively starting with the positions of the highest order, so that as each pulse causes a given trigger to return to its initial state, the trigger in the next lower order is switched to its active state.

*Program Unit*

The program unit comprises triggers P1 through P*n* (FIG. 1*a*) in any desired number, and a pilot trigger B8. These triggers are set to conduct normally as shown by the dot in the lower part of each trigger box.

With each trigger P1, P2, etc. are associated the following: a control plug hub 137 (for trigger P1) selectively conectable to a source of voltage for initiating a program; an output plug hub 138 for the controlling of the initiation of the next routine of the program in a series of routines; an output hub 139 for the controlling of the type of operation to be performed; and two output hubs 140 and 141 for controlling memory checking circuits.

Inasmuch as the normal stable state of trigger B8 is as shown, output wire 111 is normally positive, and likewise plug hub 143 is relatively positive. This plug hub will normally be connected to control whichever programs is to be processed first, e.g. plug hug 137 if the process of program 1 is desired first. Output wire 111 of trigger B8 is also connected to the following circuits: AND circuit 112 (FIG. 1*b*); inverter 142, AND circuits 144, 145, 146 are made relatively negative at one of their respective inputs and are thus rendered non-conductive; pulse shaping circuits 147 and 147*a* (FIG. 1*a*); and AND circuit 150.

A manual or automatic making of contact 105 (FIG. 1*b*) causes the pulse generator to start as has been described above. Line 103, thus transmits the first positive pulse to AND circuit 151, to inverter 152 and AND circuit 153. Trigger B4 being reset initially as shown output line 110 of this trigger has impressed thereupon a positive voltage, thereby conditioning AND circuit 151 for conduction. This line 110 also extends to AND circuits 151, 153 and 112. AND circuit 151 through its two inputs being conditioned to conduct, transmits a positive pulse on line 154 to amplifier 155 which shapes the pulse without change of phase, transmitting the same on line 156 to AND circuits 150 and 157 (FIG. 1*a*). Both these circuits being conditioned to conduct (the first due to the fact that line 111 has a positive voltage, and the second due to the connection set up between hubs 143 and 137), positive pulses thus are impressed on triggers B8 and P1 for switching the state of these triggers. Line 111 from B8 is thus rendered negative. Similarly, line 158 from P1 is rendered positive, as are likewise plug hubs 138 and 139.

Synchronously with these operations, AND circuit 153 (FIG. 1*b*) delivers a positive pulse for switching triggers B4 and B5. Line 110 is thus rendered negative as is line 109 connected to AND circiut 112. Output line 117 of inverter 116, on the other hand, is now positive thereby enabling transmission of pulses through coincidence circuit 118, for also enabling the pulse generator, comprising emitters 100*a*, 103*a* to operate in a closed ring.

*Memory Control and Splitting Device*

Assume that the program controlled by trigger P1 (FIG. 1*a*) directs the addition of two factors which may be for purposes of illustration:

$$\begin{array}{r} 0028 \\ +000645 \\ \hline 000673 \end{array}$$

both factors being contained, respectively, in positions 14 through 17 in memory 1 (factor 0028) and 58 through 63 in memory 2 (factor 000645), the result of the operation being substituted for the latter factor. In this case, plug hub 140 (FIG. 1*a*) serves to control factor 0028, and plug hub 141 serves to control second factor operations.

The following plug hub connections are necessary:

(1) Plug hub 139 (FIG. 1*a*) to plug hub 161 (addition, FIG. 1*d*).

(2) Plug hub 140 (FIG. 1*a*) to one of plug hubs 162 (e.g. hub 162–2).

(3) Plug hub 163–2 to plug hub 164–1 controlling memory 1 (FIG. 1*e*). (It has been assumed that factor 0028 was in positions 14 through 17 in memory 1.)

(4) Plug hub 165–2 (FIG. 1*a*) to that of plug hubs 166 bearing No. 14 (FIG. 1*c*).

(5) Plug hub 167–2 (FIG. 1*a*) to that of plug hubs 166 bearing No. 17.

(6) Plug hub 141 to another of jacks 162, e.g. plug hub 162–3.

(7) Plug hub 163–3 to hub 164–2 controlling memory 2 (FIG. 1*e*). (It has been assumed that factor 000645 was in positions 58 through 63 in memory 2.)

(8) Plug hub 165–3 (FIG. 1*a*) to that of plug hubs 166 bearing No. 58 (FIG. 1*c*).

(9) Plug hub 167–3 (FIG. 1*a*) to that of plug hubs 166 bearing No. 63 (FIG. 1*c*).

It has been explained already that lines 122 and 122*a* (FIG. 1*b*) alternately transmit a series of positive pulses as a result of the switching of triggers B1 and B2. Similarly plug hubs 140 and 141 are alternately rendered conductive.

From the foregoing it will be appreciated that trigger chains C and C′ alternately and respectively condition AND circuits 134 and 169 for operation. Synchronously, and alternately lines 122 and 122*a* deliver positive pulses to the other inputs of AND circuits 134 and 169 for the purpose of rendering OR circuits 170 conductive at each pulse interval.

Assume that first chain $C_1$ through $C_n$ only is operated, and triggers initally set as shown in the figure: plug hubs 166*n*, 166(*n*—1) etc., will successively emit a series of pulses synchronized with the pulses emitted by line 122*a* and subsequently synchronized with the pulses emitted by plug hub 140 (FIG. 1*a*). Some of plug hubs 166 being connected respectively to plug hubs 165–2 and 167–2, coincidence detections will result therefrom every time the position of the scanning chain corresponds to one of the connections set up between those plug hubs.

In connection with the problem stated above, plug hub 166–17 is connected to plug hub 167–2. Consequently, there will be a detection of coincidence when the chain is at position 17, which coincidence will operate AND circuit 171–2 (FIG. 1*a*) and impress a voltage on line 148. Likewise, plug hub 166–14, No. 14, is connected to plug hub 165–2. Another coincidence detection will result from this later on, when the chain is at position 14, and this coincidence will operate AND circuit 172–2 and impress a voltage on line 149.

It will be noted that plug hubs 166 emit pulses synchronized with the pulses emitted by line 122 (when chain $C'_1$ through $C'_n$ is operated) and subsequently synchronized with pulses emitted by plug hub 141 (FIG. 1*a*). Two other coincidence detections will result from this, when chain C′ is at positions 63 and 68, due to the connections set up between corresponding plug hubs 166 and plug hubs 167–3 and 165–3. These detections of coincidence operate coincidence circuits 171–3 and 172–3 and also cause a voltage to be impressed on lines 148 and 149.

Starting from the moment when line 103 emits its first pulse for causing triggers B4, B5 (FIG. 1*b*) and B8, P1 (FIG. 1*a*) to switch and thus impressing a negative voltage on lines 111 and 110 (FIG. 1*b*), as well as a positive voltage on lines 160 and 158 (FIG. 1*a*). A first switching of triggers B1 and B2 (FIG. 1*b*) produces a first advance pulse on line 131.

Triggers B3 and B6 are in their initial state, output lines 173 and 174 are positive, as is line 175 from AND circuit 176 and the line from coincidence circuit 119, since the second impulse impressed on the last circuit is the same as that occurring on line 103. Line 120 is negative due to the action of inverter 123 and becomes positive as soon as pulse 103 ceases. AND circuit 121 then transmits a positive pulse, as explained in a more detailed description of the circuit of FIG. 6*a*, which pulse causes actually triggers B1 and B2 to be switched.

Output line 177 of trigger B6 is negative, as is also line 178 from coincidence circuit 179. Under these conditions line 180 from inverter 181 is positive for conditioning AND circuit 130. The latter, also receiving pulses from line 103, produces a positive voltage for operation of coincidence circuit 129 (before the switching of trigger B1). Line 131 from inverter 125 then is negative. All these voltages are reversed when line 103 returns to negative potential. Line 131 then becomes positive, producing a positive pulse from AND circuit **182*n*** (FIG. 1*c*). (Trigger $C'_n$ is switched as shown in the figure.) The states of triggers $C'_n$, $C'_{(n-1)}$ thus are switched.

Plug hub **166*n* initially is positive due to the initial states of triggers $C'_n$ and B1 which condition the two inputs of the coincidence circuit simultaneously to conduct. It still remains in this state during the time that trigger B2 is switched. Trigger $C_n$ being reset initially as shown in the figure, both inputs of AND circuit 134*n*** are conditioned to conduct simultaneously.

The pulse generator continuing its operation, line 103 emits a second pulse accompanied with the following effects; emission of a positive pulse by AND circuit **121*a* and return of triggers B1, B2 to their initial state; emission of a positive pulse by AND circuit 133*n* and switching of triggers $C_n$, $C_{(n-1)}$. Plug hub 166*n* becomes negative due to the suppression of the voltage leading to AND circuit 134*n*. Similarly plug hub 166(*n*−1) becomes positive through coincidence circuit 169(*n*−1)**.

Generally speaking, all plug hubs 166 each become positive in turn, the shift from one plug hub to the immediately preceding one being effected under action of pulses received by lines 131 and **131*a*. The positive voltage of a given plug hub coincides first with a positive voltage of line 122, then a positive voltage of line 122*a*. For example, the positive voltage of plug hub 166(*n*−1) is obtained first by AND circuit 169(*n*−1), then immediately after by AND circuit 134(−1)**. This is due to the manner whereby chains C and C′ have been restored, and to the fact that these chains are operating in synchronization. It is to be seen that this constitutes a specific case since, actually, chains C and C′ normally operate in an asychronized manner.

The successive advance of the chains continues until a pulse is sensed at the first plug wire connection leading to plug hubs 167–2 or 167–3 (FIG. 1*a*). Connections leading to plug hubs 165–2 and 165–3 for the moment have no effect due to the fact that they impart to line 149 a positive voltage, and this line leads to coincidence circuits 182 and 183 which now are blocked.

A coincidence is sensed when line 122 is positive, causing operation of circuit 171–3 for producing on line 148 a positive voltage. Line 160 (FIG. 1*b*) being positive, AND circuit 184 makes line 185 positive and at the same time line 180 negative, the presence of inverter 181 reversing the voltages. AND circuit 130 momentarily is blocked, thereby preventing any pulse on line 131. Under these conditions, there is no advance of chain C′ when next pulse delivered by line 103 comes up. Therefore, it will remain in the position where it is, that is position 63. It should be noted that this position corresponds to the units digit of one of the two factors to be added.

Line 185 being positive, AND circuit 186 is conditioned to conduct. Thus, it generates a positive pulse, during the time of the next pulse in line 103, which pulse serves the purpose of switching triggers B5 and B6. At the same time, a positive pulse is transmitted through AND circuit 121 causing triggers B1 and B2 to be switched. The whole of the following results therefrom:

(1) Return of the voltages in lines 122 and 160 to a negative value.

(2) Return to a negative voltage in all the circuits controlled from line 122, particularly for plug hub 141 (FIG. 1*a*) and plug hub 162–3 connected thereto.

(3) Return to a negative voltage on lines 148, 185, 174 and 175. The transmission of the pulses for successive switching of triggers B1, B2 thus is blocked temporarily. On the other hand, line 180 becomes positive allowing the transmission of the pulses through AND circuit 130. Voltage in line 177 becomes positive.

Both chains advance in synchronism, chain C is in position 63, so that the voltage of plug hubs 166 associated therewith is positive as is the voltage at plug hub 167–3 (FIG. 1*a*). No effect will result therefrom due to the fact that the voltage of plug hub 162–3 now is negative.

Line **122*a* being positive, all pulses in line 103 will be applied to AND circuit 125*a* and therefrom to line 131*a*. A continuous advance of chain C will result, until the chain reaches position 17. It has been seen that corresponding plug hub 166 was connected to plug hub 167–2** (FIG. 1*a*). The voltage on these plug hubs being positive, the voltage of plug hubs 140 through 162–2 being positive, a coincidence is sensed, which causes the voltage on line 148 to be positive. Line 177 (FIG. 1*b*) also being positive, the voltage on line 178 is positive, for producing a negative voltage on line 180 to block AND circuit 130. The advance of chain C thus is stopped temporarily in position 17, that is the position which corresponds to the unit digit of the second magnitude to be added. At the same time, coincidence circuit 187 is operated, in analogous conditions to those already mentioned, causing the emission of a positive pulse and the switching of triggers B6 and B7. The voltage in line 174 thus returns to a positive value, enabling pulses to be transmitted through line 120 for operating triggers B1 and B2.

The switching of trigger B7 controls arithmetical operations to be examined in detail later on. These operations are performed digit by digit, in two steps, the first step always corresponding to a positive voltage impressed on line 122*a*. This is the case of the example contemplated. Trigger B7 has been switched while line 122*a* was positive. The voltage in this line now, maintains its value since no pulse has been sent to triggers B1, B2.

According to the way that plug wire connections are set up, it is possible that chain C comes to this position before chain C'. If this be the case, chain C' must advance, which occurs in a manner similar to that described, this operation being characterized by a positive voltage in line 122. When line 178 is positive, both voltages are directed into AND circuit 183 for producing a positive pulse by AND circuit 121 and the switching of the states of triggers B1, B2. Under these conditions, the first step of the arithmetical operations still corresponds to a positive pulse impressed on line 122*a*.

When trigger B7 is switched chains C and C', respectively, are in positions 17 and 63, that is actually in the positions corresponding to the unit digit of the factors to be added. Trigger B2 being switched, produces a positive potential on line 122*a* where the following operation is performed: $a+b=b'$. Factors *a* and *b*, respectively have 4 and 6 digits.

*First operation.*—Readout of the unit digit of factor *a*, that is 8, for introduction into the adder. At the end of this operation, chain C is driven to position 16, during the time the advance pulse transmitted through line 131*a*.

*Second operation.*—Readout of the unit digit of factor B for introduction in the adder, that is 5. Rewrite of digit 3, which is the digit of the units sum (8+5). The carry of this basic operation is kept in the adder. The circuits of the adder then are restored so as to enable the following operations to be processed. The whole of these operations being completed, chain C' is driven to position 62.

*Third operation.*—Readout of the digit of the tens in factor *a*, that is 2, for introduction into the adder. Chain C then is driven to position 15, that is the digit of the hundreds of factor *a*.

*Fourth operation.*—Readout of the digit of the tens in factor *b*, that is 4, for introduction into the adder. Rewrite of the sum of the digits of the tens, this quantity increased by the carry from the units to the tens. Chain C' then is driven to position 61.

*Fifth and sixth operations.*—Readout of the digit of hundreds in factor *a* and *b* for introduction into the adder. Rewrite of the sum, the carry from the tens to the hundreds being taken into account. Chains C and C' then are driven, respectively, to positions 14 and 60, that is positions corresponding to the digit of the thousands of factors *a* and *b*.

*Seventh operation.*—Readout of the digit of the thousands in factor *a* for introduction into the adder. At the same time, plug hub 166–14 (FIG. 1*c*) receives a positive voltage, and so does hub 165–2 (FIG. 1*a*) due to the connection set up between both these hubs. Line 122*a* then being positive so are plug hubs 140 and 162–2. A coincidence is sensed by circuit 172–2 which causes a positive voltage to be impressed on line 149. AND circuit 183 (FIG. 1*b*) thus is conditioned to conduct through its three inputs, line 188 also having a positive voltage. The output lines condition AND circuit 189 for enabling trigger B3 to be switched when the next pulse arrives from line 103. At the same time coincidence circuit 121*a* transmits a positive pulse which causes triggers B1, B2 to be switched. Finally the following conditions are set up: (*a*) line 122 is positive, (*b*) line 176 is negative preventing switching of triggers B1, B2.

*Eighth operation.*—Readout of the digit of the thousands in factor *b* for introduction into the adder. Rewrite of the result of the thousand digit addition from the hundreds of the thousands being taken into account. At the end of this operation, chain C' is driven to position 59.

*Ninth operation.*—Readout of the ten-thousand digit in factor *b* for introduction into the adder. Rewrite of the same digit, the carry from the thousands to the ten-thousands being taken into account. The operations are completed for factor *a*. Chain C' then is driven to position 58.

*Tenth operation.*—Readout and introduction into the adder of the hundred-thousand digit in factor *b*. Rewrite of this digit, the possible carry from the ten-thousands to the hundred-thousands being taken into account. At the same time, plug hub 166–58 (FIG. 1*c*) becomes positive and so does plug hub 165–3 (FIG. 1*a*) due to the connection set up between these two hubs. Line 122 then being positive, so is hub 141 as is hub 162–3 connected thereto. Another coincidence is sensed through circuit 172–3 which causes a positive voltage to be impressed on line 149. AND circuit 182 (FIG. 1*b*) is operated and causes a positive voltage to be impressed on line 190 allowing a subsequent transmission of a positive pulse through AND circuit 191. Triggers B3, B4, B7, are thus reset to their initial state.

It should be mentioned that connection leading to plug hub 165–2 could have been omitted, the purpose of this connection having been examined in the foregoing (7th operation). In this case, chain C would have advanced successively toward positions 13 and 12. The switching of trigger B3 would not have occurred whereas the connection leading to plug hub 165–3 (FIG. 1*a*) would have caused effects already mentioned (switching of triggers B4, B7).

Trigger B4 having been switched as mentioned above, line 110 returns to a positive voltage. AND circuit 151 is conditioned to conduct for allowing transmission of an advance pulse through line 156. This pulse is applied first to AND circuit 192 (FIG. 1*a*) thus resetting trigger P1 and suppressing transmission of all pulses through plug hubs 138, 139, 140, and 141. This pulse in line 156 is directed into AND circuit 193 if a new derived program of calculation is desired, which program then is controlled by trigger P2. In this case a connection must be set up between plug hubs 138 and 194. The pulse in line 156 may be applied to AND circuit 195 in the case where the calculation program which has just been completed is the last of the series. In this case, plug hub 138 must be connected to plug hub 196. Trigger B8 then is reset to its initial state, causing the return to a positive voltage of line 111. AND circuit 112 (FIG. 1*b*) then is started since lines 110 and 111 both have a positive voltage, which causes positive voltage to be impressed on line 109, and a negative voltage on line 117. Coincidence circuit 118 thus is blocked putting the pulse distributor out of action.

*Arithmetical Operations*

The arithmetical operations will now be described in detail, that is to say the operations relating to the addition of two digits (operations 1 and 2 above).

It has been seen that the scanning chains then were in positions 17 and 63, but for purposes of illustration it will be assumed that they are in positions 2 and 3, respectively.

Trigger B7 (FIG. 1*b*) having been switched, line 188 is positive, and so is the second input of AND circuit 144, the negative voltage on line 111 being reversed in phase by inverter 142. Output line 197 is positive voltage, thus conditioning AND circuits 145 and 146.

The switching of trigger B7 is performed under action of the trailing edge of pulse 103. Next pulse to come is that of line 100 (also refer to FIG. 2), then those of lines 101, 102 and again 103. AND circuits 145 and 146 will direct successively into line 198 and 199 pulses, respectively, synchronized with pulses 101 and 103. Meanwhile, line 122*a* is maintained positive.

(*a*) *Action of the positive pulse emitted by line 198.*—Chain C being assumed in position 2, AND circuit 134–2 (FIG. 1*c*) delivers a positive voltage which conditions line 200 and AND circuit 201. A positive voltage thus is applied to element 202 causing this element to operate. The latter has been described in detail particularly in U.S. patent application Ser. No. 646,892, filed on March 18, 1957, entitled "Pulse Generator," now U. S. Patent 3,021,484. It is a current emitter feeding line 203 for generating a current with an accurately defined magnitude, but insufficient to modify the remanent magnetism of a magnetic core if this current is present alone. This current systematically scans positions 2 in the assumed case.

It has been seen that two connections had been set up between plug hubs 140 (FIG. 1*a*) and 162–2 on the one hand and 163–2 and 164–1 (FIG. 1*e*) on the other hand. All of these plug hubs are due to the fact that line **122*a* is positive. AND circuit 204 emits a positive voltage which causes current emitters 205 to operate. The emitted current scans all the positions in memory 1. As to position 2 in this memory, its action adds to that of current emitted by line 203**.

It is known that, in this case, currents are so calculated as to set all the cores in the same magnetic state and switch particularly all the cores endowed with a different magnetic state. Conventionally, the first state is the binary "zero" state, and the second the binary "one" state. The rows of cores represent conventionally (according to the example adopted for the type of code) digits 1, 2, 4, 8. Subsequently, if digit 7 is entered in the sensed position in the memory, cores 1, 2, 4 are in the "one" state, and core 8 in the "zero" state. The return of the cores from the "one" state to the "zero" state, develops an induced current which is sensed on lines 206 by amplifiers 207. The latter have been described in detail in FIG. 9*a*. They bear indices 1, 2, 4, 8 which correspond to the digits they represent. Some of lines 208 (FIG. 1*d*) thus receive a positive voltage (lines 1, 2, 4 in the chosen example), and this positive voltage is impressed on triggers B11, B12, B14, B18 (the digit of the units corresponds to code 1, 2, 4, 8). Triggers B11, B12, B14 thus are switched.

It is possible to verify that line 209 now has a positive voltage and AND circuits 210 operate for all of lines 208 which are positive. As a matter of fact, it has been seen that a connection had been set up from plug hub 139 (FIG. 1*a*) to plug hub 161 (FIG. 1*d*). Line 211, therefore, is positive, as is line 198 and line 209 which originates from AND circuit 212.

(*b*) *Action of the positive pulse from line 199.*—Pulse 101 (FIG. 1*b*) terminating, develops a pulse 102 and then a pulse 103 which causes a positive voltage to be impressed on line 199. Line 213 besides, is negative due to inverter 214. Lines 215 and 216 also are positive. The first has an effect on AND circuits 217 and causes the switching of those triggers B′11, B′12, B′14, B′18, equivalent to triggers B11, B12, B14, B18 which has already been switched. Line 216 being positive operates AND circuits 218 rendering lines 219 and 220 positive. Lines 220 (also refer to FIG. 1*e*) lead to AND circuits 221–1, 221–2, 221–4, 221–8. At the same time, AND circuit 222 transmits a positive voltage. The result is to operate current emitters 223 and more particularly those referenced 1, 2, 4 in the case of the example. These emitters, identical with emitters 205 and 202 (FIG. 1*c*), produce a current which, if it operates alone, is insufficient to modify the remanent magnetic state of a core. It also should be noted that the flow of the current is in the opposite direction.

Lines 199 and 200 (FIG. 1*c*) both being positive, render AND circuit **201*a* and current emitter 202*a* conductive. As the latter conducts in the same direction as emitters 223.1 through 223.8, the simultaneous action of both currents are sufficient to cause the reversal of magnetism in the cores. The cores meeting this condition are cores 1, 2, 4 in position 2 in memory 1**, and they will return to their initial binary "zero" state.

As the pulse in line 103 (FIG. 1*b*) terminates, line 213 assumes a positive value as do lines 120 and **131*a*. A positive pulse thus is generated by AND circuit 224** (FIG.1*d*) for resetting triggers B11 through B18 to delete the quantity entered therein. Another positive pulse is generated by AND circuit **121*a*** (FIG. 1*b*) for switching triggers B1, B2 while a positive pulse is still generated by AND circuit 133.2 (FIG. 1*c*) causing chain C to resume stepping. The voltage on line **122*a*** (FIG. 1*b*) becomes negative while the voltage on line 122 becomes positive.

(*c*) *Action of the second pulse emitted on line 198.*—Chain C′ has been assumed in position 3 (FIG. 1*c*). Meanwhile, plug hub 141 (FIG. 1*a*) is positive (due to the fact that line 122 itself is positive), as are plug hubs 162–3, 163–3, 164–2 (FIG. 1*e*). The read out of the quantity contained in the 3rd position in memory 2 is performed in a way similar to that already described, causing amplifiers 207 to conduct and triggers B11 through B18 (FIG. 1*d*) to be switched. If the digit entered in the memory is a 5, triggers B11 and B14 will be switched. It should be recalled that some of triggers B′11 through B′18 have been switched and still are in this condition. Switched triggers are B′11, B′12, B′14 if the digit previously read from memory 1 is a 7.

Outputs 225 and 226 of triggers B11 through B18 and B′11 through B′18 control an adder 227 of any common type which effects addition of digits entered, and as function of the addition result, drives some of the lines 228 to a positive voltage. In the case considered, the sum is 7+5=12, so that it is only that of lines 228 referenced 2 which will be driven to a positive voltage, whereas the carry provisionally is kept in the adder.

(*d*) *Action of the second positive pulse emitted by line 199.*—This positive pulse is directed into AND circuit 230, line 229, and AND circuits 231. That of lines 228 referenced 2 being driven to a positive voltage, it is the same for that of lines 232, also referenced 2, and that corresponding to lines 220. Digit 2 then is rewritten in memory 2, in position 2, in a manner similar to that already described.

Line 213 (FIG. 1*b*) is negative and returns positive when the pulse in line 103 ceases. The result is positive pulses emitted by AND circuits 224, 293 (FIG. 1*d*) which cause the reset of triggers B11 through B18 on the one hand, and B′11 through B18 on the other hand. Meanwhile, lines 120 and 131 (FIG. 1*b*) assume a positive value causing triggers B1, B2 to be switched and chain C′ to advance.

Likewise, splitting inside of a field may be modified. For example, it is possible to use positions 21 through 30 in any memory, in order to accumulate therein different factors comprising from one to several decimals, and then read the result from the whole of the operations, but rounded to the immediate lower unit. Likewise, factors may be heterogeneous, some of them comprising no decimals. In this case, constant adjustments of the weight order are necessary, which are obtained without difficulty by modifying the connections set up from plug hubs 166 (FIG. 1*c*) and using, if need be, several assemblies such as those formed by plug hubs 162–1, 163–1, 165–1, 167–1 (FIG. 1*a*) and AND circuits 171–1 and 172–1.

Figure 3:
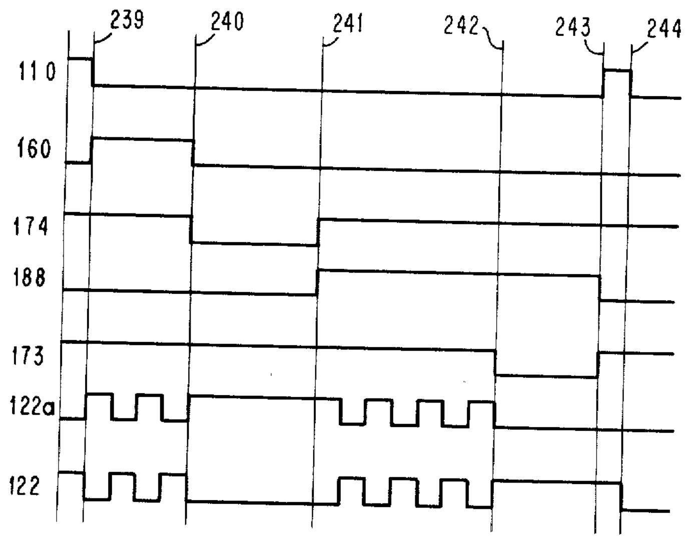
FIGS. 2 and 3 are pulse timing charts.

Referring now to FIG. 3, a summary is of the most important operations performed during the process of a program: Start of the program, for example the program controlled by trigger P1 (also refer to FIG. 1*a*) at the level of vertical line 239. Simultaneous advance of chains C and C′ between vertical lines 239 and 240. Advance limited to a single chain C or C′, between vertical lines 240 and 241, effect arithmetical operations between vertical lines 241 and 243. Start of the next program at the level of vertical line 244.

During the process of the arithmetical operations, chains C and C′ first advance together, between vertical lines 241 and 242. Chain C′ then may advance alone during a certain time, when chain C has scanned completely the field under its control, and when chain C′ controls a memory field wider than that controlled by chain C.

*Transfer*

If a quantity is to be transferred from a field in one memory into another field, without addition, a connection must be set up between plug hub 139 (FIG. 1*a*) and plug hub 234 (FIG. 1*d*). Operations will be described for the transfer of a single digit. It is assumed that the quantity to be transferred is digit 7 contained in position 2 in memory 1 and that this quantity must be driven into position 3 in memory 2.

All the operations relating to the transfer are identical with those already described, except that it is now plug hub 234 (FIG. 1*d*) which is positive, instead of plug hub 161. The readout of digit 7 is identical with that described previously. It is just the same as to the subsequent rewriting of the same digit. The only difference is that triggers B11 through B18 are not reset, and triggers B′11 through B′18 are not controlled. As a matter of fact, line 211 being negative, pulses for resetting triggers B11 through B18 are now controlled by AND circuit 235 which can start only when line 122 is positive. This is not the case since this first operation is characterized by a positive voltage on line 122*a*. Likewise, AND circuit 236 is blocked due to a negative voltage on line 211.

Line 122 becoming positive, a readout and a rewrite in position 3 in memory 2 is effected. The readout is inoperative due to the fact that AND circuits 212 and 237 are blocked and that it is the same for AND circuits 210. This readout however causes the deletion of the quantity that would have been entered. Rewrite is performed under control of triggers B11 through B18 and AND circuits 218, AND circuit 238 being conditioned to conduct.

In the foregoing, operations have been described which relate to the process of a single program. These operations are processed in a way identical with that of another program, except that scanning chains C and C′, at the beginning of this program may be in any position, instead of being both in position 80. The result always is the positioning of the scanning chains on the unit digit of the factors since coincidence sensed in line 149 (FIG. 1*a*) are of no effect as long as coincidences sensed in line 148 have not occurred.

While there have been shown and described and pointed out the fundamental features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A system for controlling a memory device including a matrix of magnetic core elements to read in, retain, and read out manifestations of data, means for selecting fields of said memory matrix consisting of a plurality of cores for storage of different data, a pulse generator, means responsive to said pulse generator for driving data address means, program control means to select a particular operation of said device and to define the location of data from said memory matrix to be used in said operation, said means for selecting fields of said memory matrix being responsive to said program means and said address means, a first and second series of bistable devices responsive to said address means to become operable in seriatim for selecting all cores serially in all fields in said memory, means under control of one of said series of devices for reading a first datum from a given field out of the memory, and means under control of the second of said series of devices for reading a second datum from another field of said memory and responsive to said program and address means for reading a combination of said first and second data back into said other field.

2. A system as claimed in claim 1 where said first and second series of bistable devices is responsive to said address means for selecting all cores in selected memory fields serially.

3. A system as claimed in claim 1, comprising field selection means responsive to said program means and to said first and second series of bistable devices, where said program means includes means for determining the limits of each selected field of cores.

4. A system comprising a pair of bistable address multivibrators, a pair of AND circuits each having a pair of inputs, a connection from each address multivibrator output to an input of each AND circuit for conditioning the same for operation, a source of pulses, means for applying said pulses to the other input of each said AND circuit inputs for producing alternately occurring pulse trains, a pair of multivibrator chains each responsive to one of said alternately occurring pulse chains, a memory matrix comprising a plurality of bistable magnetic core elements, a plurality of program initiating multivibrators responsive to said source of pulses, and AND circuits responsive to said program multivibrators and to pulses produced by said pair of address multivibrators for initiating data read in and read out from said memory matrix under control of said pair of multivibrator chains.

5. Apparatus as claimed in claim 4, comprising means under the control of one of said pair of multivibrator chains operative to disable the other of said pair of multivibrator chains during a readout of data.

6. Apparatus as claimed in claim 4, including a first single pulse producing means responsive to said program initiating multivibrator means for conditioning the read out of data from a predetermined memory field, a second single pulse producing means responsive to said program multivibrator means for enabling data read out from another predetermined memory field, a third single pulse producing means responsive to said program multivibrator means for defining the operation to be performed on these data from said memory fields where said first, second and third single pulse producing means co-act with said pair of multivibrator chains for reading in the result of said operation when performed into said other predetermined memory field under control of said second single pulse producing means.

7. A system comprising a pair of bistable address multivibrators, a pair of AND circuits each having a pair of inputs, a connection from each address multivibrator output to an input of each AND circuit for conditioning the same for operation, a source of pulses, means for applying said pulses to the other input of each said AND circuit inputs for producing alternately occurring pulse trains, a pair of multivibrator chains each responsive to one of said alternately occurring pulse chains, a memory matrix comprising a plurality of bistable magnetic core elements, a plurality of program initiating multivibrators responsive to said source of pulses, AND circuits responsive to said program multivibrators and to pulses produced by said pair of address multivibrators for initiating data read in and read out from said memory matrix under control of said pair of multivibrator chains, and AND circuit means responsive to said address multivibrators for initiating serial readout of data from said memory beginning with the units order digits.

8. In a data processing machine, an array of static data storage elements, first addressing means for independently addressing any element of said array, second addressing means for independently addressing any element of said array, means for alternately operating said addressing means to alternately address elements of said array, means for conveying data from elements of said array addressed by said addressing means, and delay means for delaying the data conveyed from elements addressed by said first addressing means whereby the data conveyed from said array by said first and said second addressing means is simultaneously manifested.

9. Apparatus according to claim 8 further characterized by the provision of means for entering data into said array under the control of said second addressing means and means connecting the outputs of said delay device to enter data into elements addressed by said second addressing means.

10. Apparatus according to claim 8 further characterized by the fact that said first and said second addressing means each comprises a ring circuit adapted to be sequentially driven through successive stages.

11. Apparatus according to claim 10 further characterized by the provision of means for independently setting a particular stage in said circuits.

12. Apparatus according to claim 11 wherein said array of static data storage elements is comprised of a plurality of magnetic cores threaded by a common sense line.

References Cited in the file of this patent

UNITED STATES PATENTS

| | | |
|---|---|---|
| 2,706,811 | Steele | Apr. 19, 1955 |
| 2,802,203 | Stuart-Williams | Aug. 6, 1957 |
| 2,832,064 | Lubkin | Apr. 22, 1958 |
| 2,916,210 | Selmer | Dec. 8, 1959 |
| 2,975,405 | Hammer | Mar. 14, 1961 |